Patented Aug. 27, 1946

2,406,613

UNITED STATES PATENT OFFICE 2,406,613

CONVERSION OF HYDROCARBON OIL

Edward C. Lee, deceased, late of Chicago, Ill., by James T. Cullinan, administrator, Chicago, Ill., and Charles L. Thomas, Riverside, Ill., assignors to Universal Oil Products Company, Chicago, Ill., a corporation of Delaware No Drawing. Application March 30, 1944, Serial No. 528,773

8 Claims. (Cl. 196—52)

This application is a continuation-in-part of our co-pending application, Serial Number 243,261 filed November 30, 1938, now Patent No. 2,347,648, May 2, 1944.

This invention relates to the conversion of hydrocarbons such as petroleum fractions and hydrocarbonaceous oils generally including synthetic oils from numerous carbon-containing sources. More particularly, the conversion involves hydrocarbons which may be vaporized without substantial decomposition.

More specifically the present invention involves conversion of hydrocarbons in the presence of specific types of catalytic materials which function to selectively promote the formation of very high antiknock gasoline. The preferred catalysts are prepared synthetically by definite steps of procedure which are specific in the production of catalysts of high activity for prolonged use.

The art of pyrolytically cracking and reforming hydrocarbons to produce high antiknock gasoline is very extensive and it is recognized that most of the basic principles involved are known and that particular commercial processes have been developed which embody these principles. On the other hand, where cracking and reforming of hydrocarbons are carried out catalytically, knowledge as to the application of catalysts is largely upon the same basis as it is in other catalytic fields, that is, it is largely empirical. A large number of catalysts tried out in cracking and reforming operations accelerate reactions leading to the formation of gas rather than of high antiknock gasoline predominantly, this being particularly evidenced by reduced metal catalysts such as iron or nickel and also certain metal oxide catalysts which accelerate principally dehydrogenation reactions. The reduced metal catalysts, in particular, have the disadvantage of being sensitive to sulfur poisoning and are quickly coated with carbonaceous materials which render them practically inert. This deposition of carbonaceous materials is frequently related to the type of decomposition selectively accelerated by the catalyst.

The present invention is concerned with converting hydrocarbon fractions in the presence of catalytic materials which are specifically adapted to accelerate the conversion of petroleum fractions and other hydrocarbonaceous materials so as to produce large yields of high antiknock gasoline boiling range fractions together with gaseous by-products which contain unusually high percentages of readily polymerizable olefins useful in further increasing the gasoline yields.

The preferred catalysts for the process are characterized by selectivity in accelerating gasoline-forming reactions rather than light-gas-forming reactions, by their selectivity in producing high antiknock gasoline, by their refractory character which enables them to retain their catalytic properties over extended periods of time under high temperature conditions of use and regeneration, by their ease and simplicity of manufacture and their exact reproducibility.

In one embodiment the present invention comprises subjecting petroleum fractions at elevated temperatures and at atmospheric or relatively low superatmospheric pressures to contact with catalytic materials comprising composite masses of silica, alumina, and zirconia prepared by adding solutions of aluminum and zirconium salts to a purified precipitated silica, thereby hydrolytically absorbing aluminum and zirconium ions in said silica and forming alumina and zirconia within said silica, thereby producing concurrently relatively high yields of high antiknock gasoline and gas containing high percentages of readily polymerizable olefins.

According to the present invention hydrocarbon fractions, for example, a petroleum gas oil, cracked distillate or a straight-run gasoline may be processed at temperatures of the usually high pressure pyrolytic cracking range but at substantially lower pressure while in contact with silica-alumina-zirconia catalysts prepared as hereinbefore set forth. The catalyst may be considered to comprise an intimate molecular admixture of silica, alumina and zirconia, all of the components of which indicate more or less low activity individually but in the aggregate display high activity. The activity is not an additive function, it being relatively constant for a wide range of proportions of the components whether in molecular or fractions of molecular proportions. No one component can be determined as the one component for which the remaining components may be considered as the promoters according to conventional terminology, nor can any component be determined as the support and the others the catalyst proper.

The silica gel in which the aluminum and zirconium ions are hydrolytically absorbed may be prepared by various methods. One of the most convenient methods of preparation is to acidify an aqueous solution of sodium silicate by the addition of an acid such as hydrochloric acid or sulfuric acid. The excess acid and the concentration of the solution in which the precipitation is brought about determine in some measure the suitability of the silica hydrogel for subsequent absorption of the aluminum and zirconium ions. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica it is treated and washed to substantially remove alkali metal ions. It is not known whether the alkali metal ions such as sodium ions are present in the primary gel in chemical combination or in an adsorbed state but it has been definitely determined that their removal is necessary if catalysts suitable for prolonged use in accelerating hydrocarbon conversion reactions are to be obtained. It is possible that the presence of the alkali metal impurities causes a sintering or fusion of the surfaces of the catalyst at elevated temperatures so that the porosity is much reduced with corresponding reduction in effective surface. Alkali metal ions may be removed by treating with solutions of acidic materials, ammonium salts generally, or salts of multivalent metals, more preferably those of aluminum and zirconium. When treating with acids, as for example, with hydrochloric acid or sulfuric acid, the acid extracts the alkali metal impurities in the silica gel. The salts formed and excess acid are then substantially removed by water washing treatment. Where ammonium salts or salts of multivalent metals are used, the ammonium or multivalent metals apparently displace the alkali metal impurities present in the composite, and the alkali metal salts formed together with a major portion of the multivalent salts are removed in the water washing treatment. The use of aluminum and zirconium salts in the purification treatment is particularly beneficial in that the purification of the silica gel and the hydrolytic absorption of the aluminum and zirconium ions occur simultaneously. The washing treatment removes the excess of these salts but a sufficient amount is retained to produce a catalytically active composite. In the treatment with ammonium salts, the small amounts of the said salts remaining after the washing operation may be driven off in subsequent treatment at elevated temperatures. The purified silica gel obtained from the acid, ammonium salts and the salts of multivalent metals (other than aluminum and zirconium) are added to a solution of salts of aluminum and zirconium and hydrated alumina and hydrated zirconia composited with the silica gel by hydrolysis with or without the use of heat.

The character and efficiency of the ultimately prepared silica-alumina-zirconia catalyst will vary more or less with precipitation, purification, ratio components and the calcination of the composites. The ratio of the components may be varied within wide limits, the limiting factor being more in evidence with respect to small proportions than with larger proportions with the various components. In general it appears that ½ to six mol percent of alumina and zirconia together with reference to silica may be considered an approximation of the minimum proportions. Experience has indicated superior results as to yields and octane number of gasoline product for catalyst comprising silica, alumina and zirconia as compared with silica-alumina or silica-zirconia catalysts. It has also been observed for some charging stocks that as the amount of zirconia is increased in a catalyst composite the dehydrogenating reactions are increased so that the gases evolved contain larger percentages of hydrogen. Further, the zirconia containing catalysts seem to be more stable to high temperature regeneration than the silica-alumina catalysts.

In general, aluminum and zirconium salts which are soluble in water to any great extent may be employed to effect the hydrolytic absorption of the aluminum and zirconium ions. The nitrates, chloride and sulphates of aluminum and zirconium are particularly suitable.

In the previous discussion, the aluminum and zirconium ions were added to the silica gel in one step. The broad invention is not limited to this procedure since satisfactory catalysts have been prepared by compositing the aluminum ions first and subsequently adding the zirconium ions or vice versa with or without intermediate heating between the hydrolytic absorption operations.

After the alumina and zirconia have been composited with the purified hydrated silica gel and water washed if desired, the catalytic material may be recovered as a filter cake and dried at a moderately elevated temperature after which it may be formed into particles of various sizes ranging from powders to granules or pelleted materials.

By calcining at temperatures of the order of approximately 500 to 1200° F., and preferably 850 to 1000° F. maximum activity of the catalyst is obtained and a further dehydration occurs.

Catalysts prepared by the various types of procedures outlined evidently possess a large total contact surface corresponding to a desirable porosity, the pores of the catalyst particles being of such size and shape that they do not become clogged with carbonaceous deposits after a long period of service, and are therefore not difficult to reactivate by oxidation. This structure is also retained after many alternate periods of use and reactivation as evidenced by the fact that the catalyst may be repeatedly reactivated by passing air, or other oxidizing gas, over the spent particles to burn off deposits of carbonaceous material at temperatures above 800° F., temperatures as high as 1400–1600° F. having been reached without apparently affecting the catalytic activity.

In accordance with the present invention the catalyst may be conveniently utilized in cracking and reforming reactions as for example when employed as filling material in tubes or chambers in the form of small pellets or granules in fixed bed relationship to the incoming reactants. Alternatively the catalyst may be employed in a fluid bed or compact bed type of operation.

In the fluidized operation the hydrocarbons are passed upwardly through a body of finely divided catalyst causing the catalyst particles to be motionalized in forming a fluid-like mass of catalyst. The catalyst may be continuously withdrawn from the reaction zone, regenerated, and returned to the reaction zone.

In the moving bed type of operation the compact bed may be continuously passed concurrently or countercurrently to the incoming reactant in the reaction zone and passed therefrom into a regeneration zone from which it is returned to the reaction zone.

After the passage of the oil vapors through the catalyst, the products from these operations, either fixed bed, fluid, or compact moving bed, may be separated into material unsuitable for further cracking, insufficiently converted fractions amenable to further catalytic cracking, gasoline boiling range materials and gases. The intermediate fractions may be returned to the reaction zone for further treatment.

Another alternative mode of operation comprises suspending the catalyst in a stream of oil and treating said suspension under suitable conditions of temperature and pressure to produce the desired conversion reactions.

The charging stock may comprise hydrocarbon fractions which are vaporizable without substantial decomposition, heavier hydrocarbonaceous materials which are not readily vaporized, or generally, the high boiling as well as lower boiling fractions. It should be recognized that hydrocarbon mixtures of low antiknock value such as naphtha cuts, gasoline lacking in light and/or heavy ends, cracked gasoline, synthetic products, etc., may be processed according to the present invention.

The normally gaseous fraction separated from the gasoline product contains much larger proportions of readily polymerizable olefins, more particularly propene and butenes, than are usually experienced in ordinary thermal cracking and these may be readily polymerized using thermal and/or catalytic treatment to produce additional yields of gasoline which may be blended if desired with the major gasoline product produced in the process. A number of polymerizing catalysts are generally known, particularly phosphoric acid deposited on siliceous adsorbent, and this and/or other polymerizing catalysts may be used to polymerize the above mentioned olefins.

The application of the present invention to cracking and reforming of hydrocarbon fractions besides being characterized by the presence of novel catalysts is further characterized by the moderate operating conditions of temperature and pressure. Temperatures employed in contact with the catalyst may be within the range of 700 to 1200° F. Substantially atmospheric pressure or moderate superatmospheric pressure up to 90 pounds per square inch or more may be used, such pressures being somewhat governed by flow conditions through the vaporizing and conversion zones and the subsequent fractionating and collecting equipment.

The following example was given to indicate the novelty and utility of the present invention but is not intended that the invention be limited to exact agreement with the data hereinafter introduced.

*Example*

About 390 cc. of concentrated hydrochloric acid and 815 cc. of solution was added to 568.4 grams of sodium silicate ($Na_2SiO_3 9H_2O$) in 3000 cc. of water which gave a liquid which was definitely acidic to blue litmus. The filter cake was then slurried in 2½ liters of water and filtered, this washing treatment being repeated several times. The filter cake was again slurried in 2½ liters of water, after which ⅛ equivalent of hydrochloric acid in 50 cc. of water was added. The precipitate was filtered and this treatment again repeated. A filter cake was slurried in water and the washing treatment repeated until the wash water was practically free from alkali metal salts. The purified silica was then slurried in a solution of aluminum chloride hexahydrate and zirconium nitrate dissolved in 4000 cc. of water. The excess liquid was then drained by filtration and the cake dried at approximately 300° F. The dried material was then pressed and sized into 6–10 mesh particles and subsequently calcined at approximately 932° F. Using a Pennsylvania gas oil as charging stock, a yield of 28.7% by volume of 400° F. end point gasoline was obtained in a once through operation. The octane number of the gasoline being 79.7. There was also produced 6.2% by volume of the original charge of readily polymerizable 3 and 4 carbon atom olefins.

We claim as our invention:

1. A conversion process which comprises subjecting a hydrocarbon oil at conversion conditions to the action of a composite catalyst comprising silica, alumina and zirconia prepared by hydrolytically absorbing alumina and zirconia on a purified silica hydrogel and heating the resulting mass to remove a major portion of its water content.

2. A process for converting a hydrocarbon oil heavier than gasoline to gasoline which comprises subjecting said oil at cracking conditions to the action of a composite catalyst comprising silica, alumina and zirconia prepared by hydrolytically absorbing alumina and zirconia on a purified silica hydrogel and heating the resulting mass to remove a major portion of its water content.

3. A process for reforming a gasoline fraction which comprises subjecting said fraction at reforming conditions to the action of a composite catalyst comprising silica, alumina and zirconia prepared by hydrolytically absorbing alumina and zirconia on a purified silica hydrogel and heating the resulting mass to remove a major portion of its water content.

4. A conversion process which comprises subjecting a hydrocarbon oil at a temperature in the range of about 800° F. to about 1200° F., to the action of the composite catalyst comprising silica, alumina and zirconia prepared by hydrolytically absorbing alumina and zirconia on a purified silica hydrogel and heating the resulting mass to remove a major portion of its water content.

5. A conversion process which comprises subjecting a hydrocarbon oil at conversion conditions to the action of a composite catalyst prepared by mixing a solution of an alkali metal silicate with an acid to form a silica hydrogel, treating said hydrogel with a reactant capable of removing alkali metal ions from said gel, contacting the purified hydrogel with a solution of aluminum and zirconium salts, precipitating alumina and zirconia on said gel by hydrolysis of said salts and heating the precipitated mass to remove a major portion of its water content.

6. A conversion process which comprises subjecting a hydrocarbon oil at conversion conditions to the action of a composite catalyst prepared by mixing a solution of an alkali metal silicate with an acid to form a silica hydrogel, treating said hydrogel with a liquid capable of removing alkali metal ions from said gel, contacting the purified hydrogel with a solution of aluminum salt, precipitating alumina on said gel by hydrolysis of said salt, contacting a composite of silica and alumina with a solution of a zirconium salt, precipitating zirconia on said composite by hydrolysis of said salt and heating the precipitated mass to remove a major portion of its water content.

7. A conversion process which comprises subjecting a hydrocarbon oil at conversion conditions to the action of a composite catalyst prepared by mixing a solution of an alkali metal silicate with an acid to form a silica hydrogel treating said hydrogel with a reactant capable of removing alkali metal ions from said gel, contacting the purified hydrogel with a solution of a zirconium salt, precipitating zirconia on said gel by hydrolysis of said salt, contacting the composite of silica and zirconia with a solution of an aluminum salt and depositing alumina on said composite by hydrolysis of the aluminum salt, and heating the precipitated mass to remove a major portion of its water content.

8. A conversion process which comprises subjecting hydrocarbons to conversion conditions in the presence of a catalyst comprising silica, alumina and zirconia prepared by hydrolysis of an aluminum salt and a zirconium salt in contact with a silica gel and heating the silica containing the thus hydrolytically deposited alumina and zirconia to remove water.

JAMES T. CULLINAN,
*Administrator of the Estate of Edward C. Lee, Deceased.*

CHARLES L. THOMAS.